(12) United States Patent
Liu et al.

(10) Patent No.: US 11,851,088 B2
(45) Date of Patent: Dec. 26, 2023

(54) METHOD FOR DETERMINING CAPABILITY BOUNDARY AND ASSOCIATED RISK OF A SAFETY REDUNDANCY AUTONOMOUS SYSTEM IN REAL-TIME

(71) Applicant: Baidu USA LLC, Sunnyvale, CA (US)

(72) Inventors: Xiaodong Liu, San Jose, CA (US); Ning Qu, Fremont, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 927 days.

(21) Appl. No.: 16/815,266

(22) Filed: Mar. 11, 2020

(65) Prior Publication Data

US 2021/0284200 A1    Sep. 16, 2021

(51) Int. Cl.
*B60W 60/00* (2020.01)
*G05D 1/00* (2006.01)

(52) U.S. Cl.
CPC ....... *B60W 60/0016* (2020.02); *G05D 1/0077* (2013.01); *G05D 1/0088* (2013.01); *B60W 2420/42* (2013.01); *B60W 2420/52* (2013.01); *G05D 2201/0213* (2013.01)

(58) Field of Classification Search
CPC ......... B60W 60/0016; B60W 2420/42; B60W 2420/52; B60W 2050/021; B60W 2050/0215; B60W 50/0205; B60W 50/0225; B60W 50/02; B60W 60/00; G05D 1/0077; G05D 1/0088; G05D 2201/0213; G05B 20/0218
See application file for complete search history.

(56) References Cited

U.S. PATENT DOCUMENTS

| | | | |
|---|---|---|---|
| 2007/0164166 A1* | 7/2007 | Hirvonen | B64C 13/504 244/175 |
| 2018/0232947 A1* | 8/2018 | Nehmadi | G01S 7/295 |
| 2018/0370540 A1* | 12/2018 | Yousuf | G06F 11/1487 |
| 2019/0049958 A1* | 2/2019 | Liu | G01S 17/00 |
| 2019/0050692 A1* | 2/2019 | Sharma | G06F 18/254 |
| 2019/0180521 A1* | 6/2019 | Miller | G07C 5/006 |
| 2019/0244445 A1* | 8/2019 | Kyes | G07C 5/008 |
| 2019/0351913 A1* | 11/2019 | Watanabe | G01S 17/42 |
| 2019/0369616 A1* | 12/2019 | Ostafew | B60W 60/00274 |
| 2020/0039531 A1* | 2/2020 | Fushimi | G01S 17/86 |

(Continued)

*Primary Examiner* — Thomas Ingram
(74) *Attorney, Agent, or Firm* — WOMBLE BOND DICKINSON (US) LLP

(57) ABSTRACT

In one embodiment, method for determining capability boundary of a safety redundancy of an autonomous driving vehicle (ADV) includes obtaining a sensor layout associated with the ADV representing a system having a plurality of sensors mounted on a plurality of locations of the ADV. A zone failure risk of one or more sensors within the predetermined zones is estimated based on statistical operational data of the one or more sensors for each of the plurality of predetermined zones. An overall failure risk of the sensors is determined based on the zone failure risks of the predetermined zones based on relative locations of the sensors across the predetermined zones. A dynamic risk adjustment is determined based on the overall failure risk of the sensors, the dynamic risk adjustment representing a reliability of a sensor system associated with the ADV for estimating a safety of autonomous driving of the ADV.

21 Claims, 12 Drawing Sheets

(56) References Cited

U.S. PATENT DOCUMENTS

| | | | |
|---|---|---|---|
| 2020/0180632 A1* | 6/2020 | Morita | B60W 30/14 |
| 2020/0180653 A1* | 6/2020 | Chi | B60W 10/04 |
| 2020/0207362 A1* | 7/2020 | Nishida | B60W 50/032 |
| 2020/0283006 A1* | 9/2020 | Tsushima | G06V 20/56 |
| 2021/0086791 A1* | 3/2021 | Hosoi | B60W 30/09 |
| 2021/0331700 A1* | 10/2021 | Liu | G01S 7/4004 |
| 2023/0090950 A1* | 3/2023 | Heyckendorf | C12Q 1/6883 |
| 2023/0113560 A1* | 4/2023 | Burson | B60W 50/0205 |
| | | | 701/30.2 |

\* cited by examiner

Safety Redundancy Autonomous Driving System (ADS) Table — 401

| | Safety Redundancy Autonomous Driving System, MTBF | | | | | |
|---|---|---|---|---|---|---|
| | Primary ADS System, MTBF | | | Back-up ADS System, MTBF | | |
| | Camera (Hour) | LiDAR (Hour) | Radar (Hour) | Camera (Hour) | LiDAR (Hour) | Radar (Hour) | Total (Hour) |
| Front | $\sim 10^x$ | $\sim 10^y$ | $\sim 10^z$ | N/A | $\sim 10^y$ (Redundant) | $\sim 10^z$ (Shared) | $\sim 10^{x+2y+z}$ |
| Side | $\sim 10^x$ | $\sim 10^y$ | N/A | N/A | $\sim 10^y$ (Shared) | N/A | $\sim 10^{x+y}$ |
| Rear | $\sim 10^x$ | $\sim 10^y$ | $\sim 10^z$ | N/A | N/A | $\sim 10^z$ (Shared) | $\sim 10^{x+y+z}$ |

FIG. 4A

Safety Redundancy for Primary Autonomous Driving System (ADS) Table ⤴ 402

Primary ADS System Only, MTBF

| | Camera (Hour) | LiDAR (Hour) | Radar (Hour) | Total (Hour) |
|---|---|---|---|---|
| Front | ~ $10^x$ | ~ $10^y$ | ~ $10^z$ | $10^{x+y+z}$ |
| Side | ~ $10^x$ | ~ $10^y$ | N/A | $10^{x+y}$ |
| Rear | ~ $10^x$ | ~ $10^y$ | ~ $10^z$ | $10^{x+y+z}$ |

FIG. 4B

Safety Redundancy for Back-up Autonomous Driving System (ADS) Table ↙ 403

| | Back-up ADS System Only, MTBF | | | |
|---|---|---|---|---|
| | Camera (Hour) | LiDAR (Hour) | Radar (Hour) | Total (Hour) |
| Front | N/A | ~$10^y$ | ~$10^z$ | $10^{y+z}$ |
| Side | N/A | ~$10^y$ | N/A | $10^y$ |
| Rear | N/A | N/A | ~$10^z$ | $10^z$ |

FIG. 4C

METHOD FOR DETERMINING CAPABILITY BOUNDARY AND ASSOCIATED RISK OF A SAFETY REDUNDANCY AUTONOMOUS SYSTEM IN REAL-TIME

TECHNICAL FIELD

Embodiments of the present disclosure relate generally to operating autonomous driving vehicles. More particularly, embodiments of the disclosure relate to a method to determine capability boundary and associated risk of a safety redundancy autonomous system in real-time.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

As autonomous driving technology advances, it is expected that geo-fenced application of an autonomous driving vehicle (ADV), such as Robotaxi on a large scale, may emerge in the next three to five years. However, key challenges remain to be addressed before the ADV can be safely deployed. Among those key challenges are (i) determining in real-time the capability boundary with an associated risk of a safety redundancy autonomous system in a defined operational design domain (ODD); (ii) monitoring the ADV operating within its capability boundary in real-time; and (iii) endowing safety redundancy autonomous system real-time minimum risk condition (MRC) decision capability and corresponding safety mechanism for internal transition. It is noted the three key challenges are interdependent to ensure overall autonomous vehicle safety.

Current industrial approach for tackling autonomous system capability is to use redundant and diversified sensors, hardware as well as algorithms. However, this approach can be costly and complicated if the capabilities among safety redundancy autonomous driving system as a whole (primary system and fallback system) are not differentiated and balanced. In addition, very little has been reported about how a system capability boundary and associated risk can be estimated.

Level 4 vehicles are "designed to perform all safety-critical driving functions and monitor roadway conditions for an entire trip." However, it is important to note that this is limited to the "operational design domain (ODD)" of the vehicle—meaning it does not cover driving scenario which is outside of ODD and risk exposure when level 4 vehicles operating within ODD is well defined and tolerable.

BRIEF DESCRIPTION OF THE DRAWINGS

Embodiments of the disclosure are illustrated by way of example and not limitation in the figures of the accompanying drawings in which like references indicate similar elements.

FIG. 4A shows a safety redundancy autonomous driving system table according to one embodiment.

FIG. 4B shows a safety redundancy autonomous driving system (primary ADS system only) table according to one embodiment.

FIG. 4C shows a safety redundancy autonomous driving system (back-up ADS system only) table according to one embodiment.

DETAILED DESCRIPTION

Figure 1A:
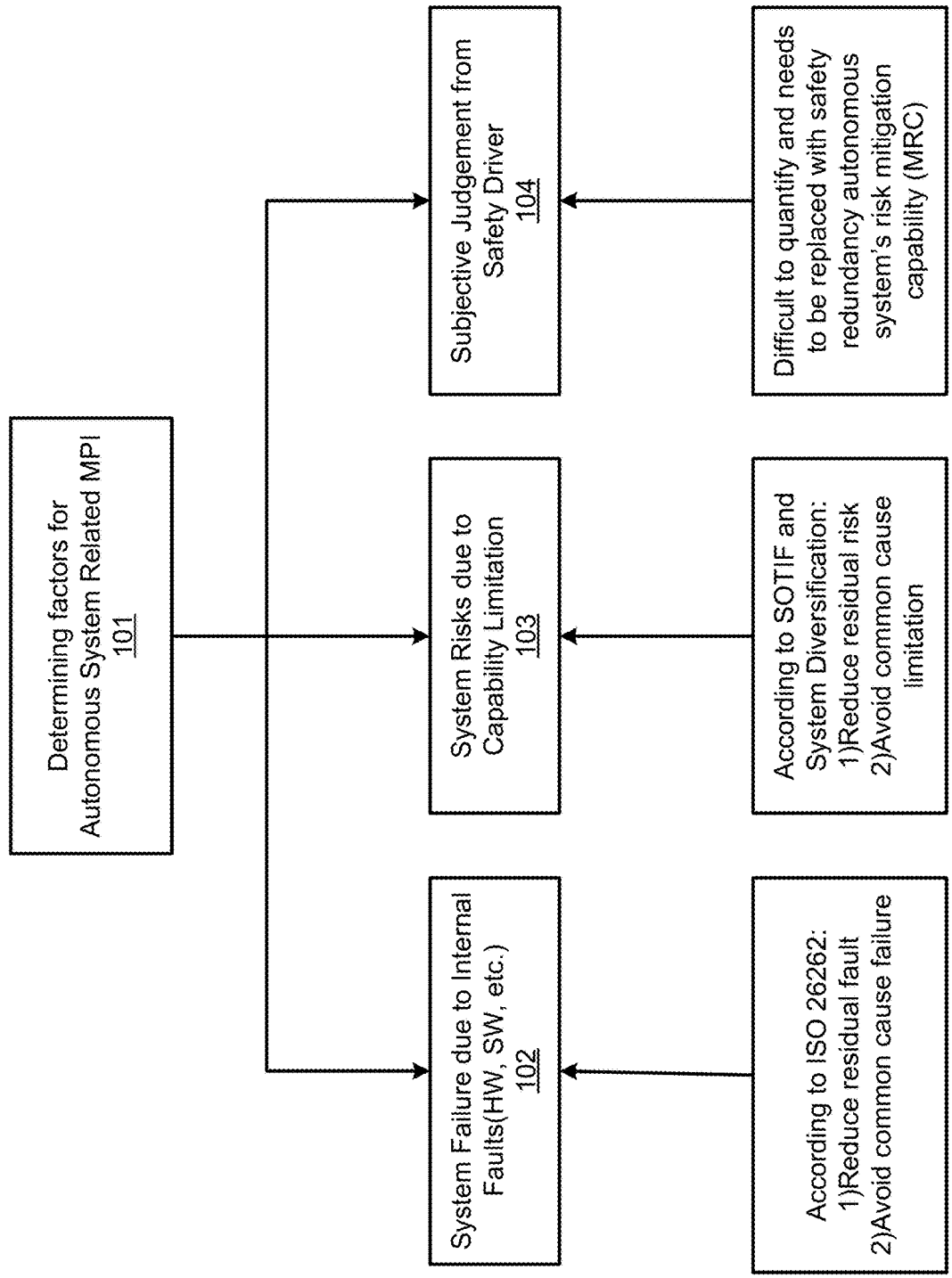
FIG. 1A is a block diagram illustrating an example of determining factors for autonomous system related miles per intervention (MPI).

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a computer-implemented method for determining capability boundary of a safety redundancy of an autonomous driving vehicle (ADV) is disclosed. A sensor layout associated with the ADV representing a system is obtained. The system includes sensors mounted on various locations of the ADV. The sensors in the sensor layout covers predetermined zones surrounding the ADV. For each of the predetermined zones, a zone failure risk of the sensors within the predetermined zones is estimated based on statistical operational data of the sensors. An overall failure risk of the sensors is then determined based on the zone failure risks of the predetermined zones based on relative locations of the sensors across the predetermined zones. Thereafter, a dynamic risk adjustment is determined based on the overall failure risk of the sensors. The dynamic risk adjustment represents a reliability of a sensor system associated with the ADV for estimating a safety of autonomous driving of the ADV.

In one embodiment, the statistical data includes data that can be used to derive a mean time between failure (MTBF) for each sensor and a corresponding position in the sensor layout. For each sensor, the MTBF represents how often the corresponding sensor experiences either a false positive or a false negative when the L4 ADV operates within ODD.

In one embodiment, the sensors include a set of primary sensors providing sensor data to a primary autonomous driving system (ADS), a set of redundant sensors providing sensor data to a back-up ADS, and a set of shared sensors shared by the primary ADS and the back-up ADS. The sensors include cameras, a LIDAR, or a radar.

In one embodiment, the MTBF for each sensor is adjusted based on a driving environment or a driving area. In one embodiment, the predetermined zones include a front zone, a side zone, and a rear zone of the ADV. The dynamic risk adjustment is used to determine a risk associated with the sensor system if one of the sensors fails.

In another aspect of the disclosure, the non-transitory machine-readable medium and the data processing system perform the processes as described above.

FIG. 1A is a block diagram illustrating an example of determining factors for autonomous system related MPI according to one embodiment of the invention. MPI is commonly used to evaluate Level 4 autonomous vehicle's maturity during proof of concept (POC) stage. Referring to FIG. 1A, the determining factors for MPI in a safety redundancy autonomous driving system include system internal failures 102, such as hardware, software, which can be adequately addressed with ISO 26262 functional safety. The determining factors for MPI system also include performance limitation or deficiency 103 that reduces the system's capability of comprehending environment and operating safely. This determining factor is supposed to be addressed with ISO 21448 (safety of the intended functionality or SOTIF). However, it is yet to be adapted for SAE Level 4 autonomous driving system since SOTIF standard is still in its early stage. Further, the determining factors for MPI include subjective judgement from safety driver 104 which is difficult to quantify and need to be replaced with safety redundancy autonomous system's risk mitigation capability (MRC) in order to be both SAE Level 4 compliant and economically viable.

Figure 1B:
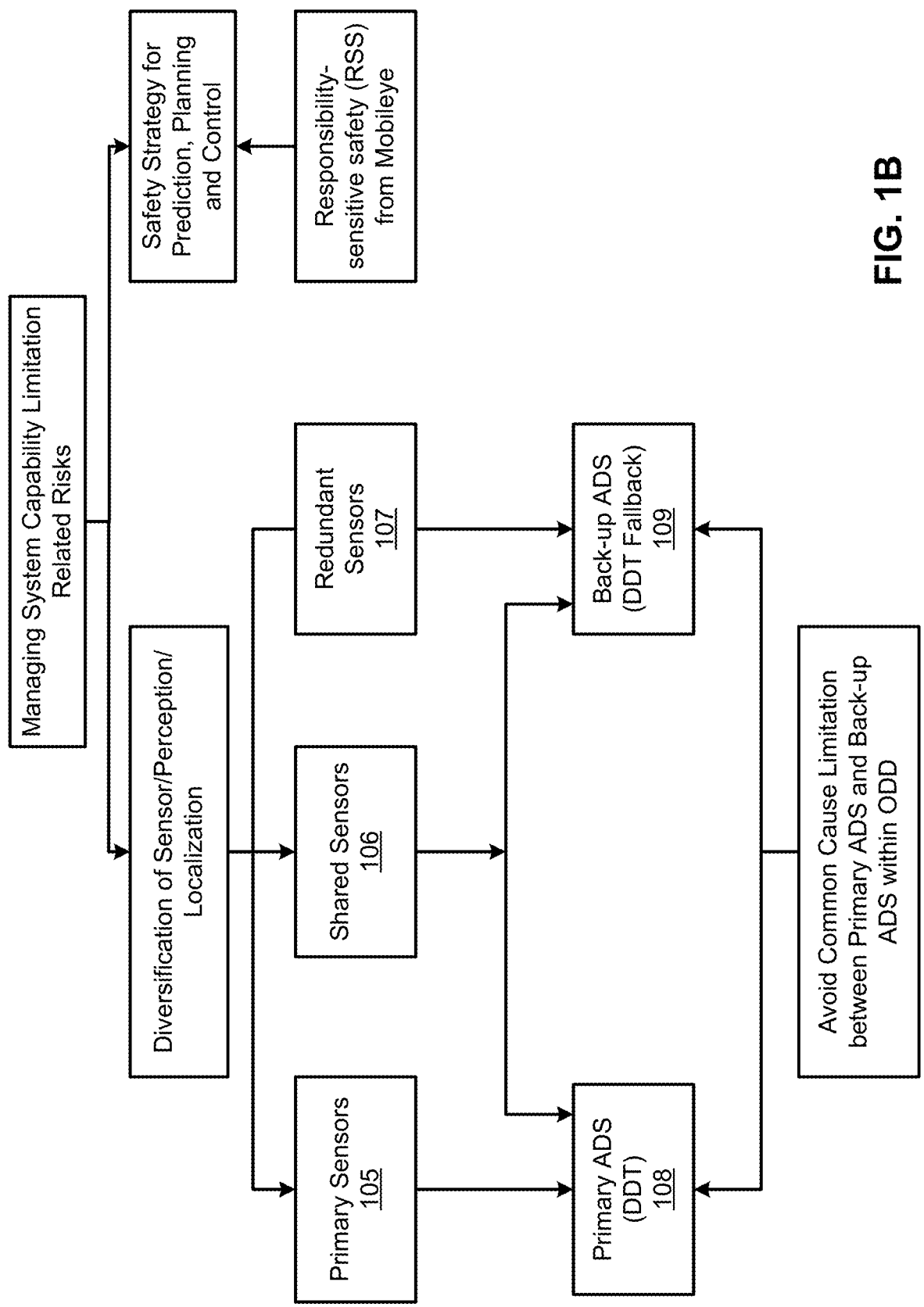
FIG. 1B is a block diagram illustrating an example of a managing system capability limitation related risks according to one embodiment of the invention.

FIG. 1B is a block diagram illustrating an example of a managing system capability limitation related risks according to one embodiment of the invention. FIG. 1B describes how a system capability limitation related risks can be managed. Referring to FIG. 1B, the risks can be categorized into (i) sensor, perception and localization related; and (ii) prediction, planning and control (motion control) related. As for the former, the risk minimization relies on redundancy or the diversification in sensor, hardware and software as well as avoidance of common cause limitation between two systems within ODD. Hence, determining the system capability boundary and associated risk is the focus of this invention. As for the latter, the associated risks can be managed with responsibility sensitive safety (RSS) from Mobileye which is a mathematically proven safety strategy.

Figure 1C:
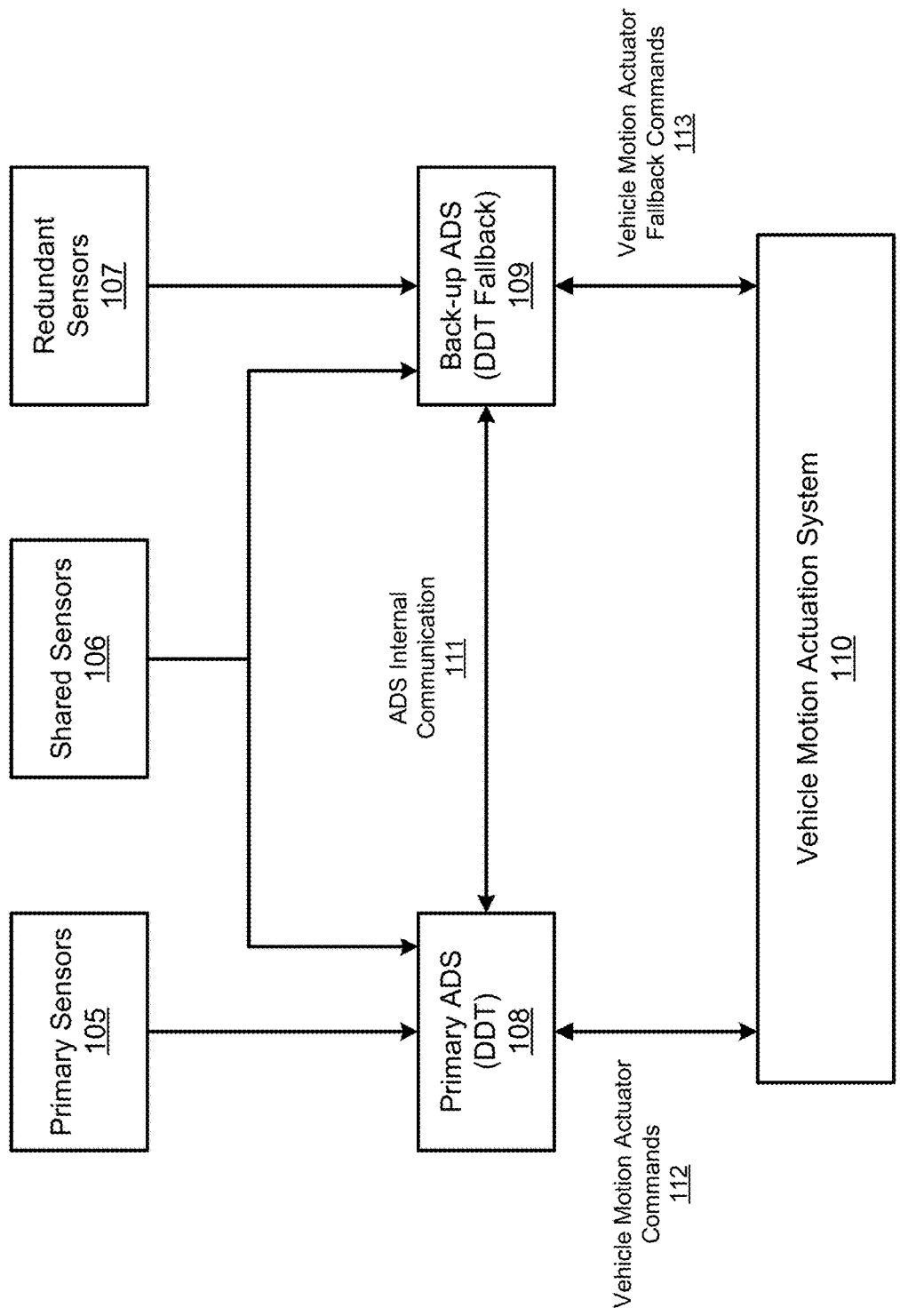
FIG. 1C is a block diagram illustrating an example of a safety redundancy module according to one embodiment of the invention.

FIG. 1C is a block diagram illustrating an example of a safety redundancy module according to one embodiment of the invention. Referring to FIG. 1C, a safety redundancy autonomous driving system balances the capability of the performance oriented primary ADS and the safety focused secondary ADS. The ADV primary sensors 105 are in communication with and dedicated to the primary ADS 108. The ADV redundant sensors 107 are in communication with and dedicated to the secondary ADS 109. Both the primary ADS 108 and the secondary ADS 109 systems are in communication with and share the shared sensors 106. The primary ADS 108 and the secondary ADS 109 systems are in communication with ADS via an internal communication link 111.

In one embodiment, for example, the vehicle motion actuator commands 112 or the vehicle motion actuator fallback commands 113 are generated and issued to the vehicle motion actuation system 110 to activate an operation during an operation of the ADV. Primary ADS 108 is responsible for normal autonomous driving of the ADV, while backup or secondary ADS 109 may take over the control of the ADV in response to determining that the primary ADS 108 fails to function properly based on information exchanged over link 111. ADS 108 is configured to perceive a driving environment surrounding the ADV based on sensor data obtained from sensors 105-106, plan a trajectory to navigate through the driving environment, and generate one or more control commands to be issued to vehicle actuation system 110. The control commands may include throttle commands, brake commands, and steering commands.

Similarly, secondary ADS 109 is configured to perceive the driving environment surrounding the ADV based on sensor data obtained from sensors 106-107. The secondary ADS 109 may operate in a standby mode during the normal operations. However, the secondary ADS 109 may plan a backup trajectory to put the ADV in a safety position in response to determining that the primary ADS 108 fails to operate properly based on data exchanged via link 111. In such a situation, secondary ADS 109 issues one or more control commands to put the ADV in a safety position, such as stopping the ADV or parking the ADV on the side of the road, etc. Further detailed information concerning an ADS will be described further below.

In such a redundancy configuration of an ADV, it is difficult to determine or quantify the failure risk of sensors mounted on the ADV since there may be many sensors of different types mounted on different locations of the vehicle. The sensors are the "eyes" of the vehicle where the vehicle depends on the sensor data to perceive a driving environment surrounding the vehicle. Thus, it is important to estimate the risk or probability of failure of at least some of the sensors and timing of such potential failure, such that proper planning (e.g., replacing or upgrading sensors) may be scheduled to ensure the vehicle can operate safely. According to one embodiment, MTBFs of sensors are utilized to calculate the potential risk of zone failure dependent upon the type of sensors (e.g., primary, secondary, and/or shared) and the locations (e.g., zones) of the sensors. That is, the MTBFs of the sensors are utilized to represent the potential risk of failure of the corresponding zone (e.g., front, rear, side zones).

Figure 2:
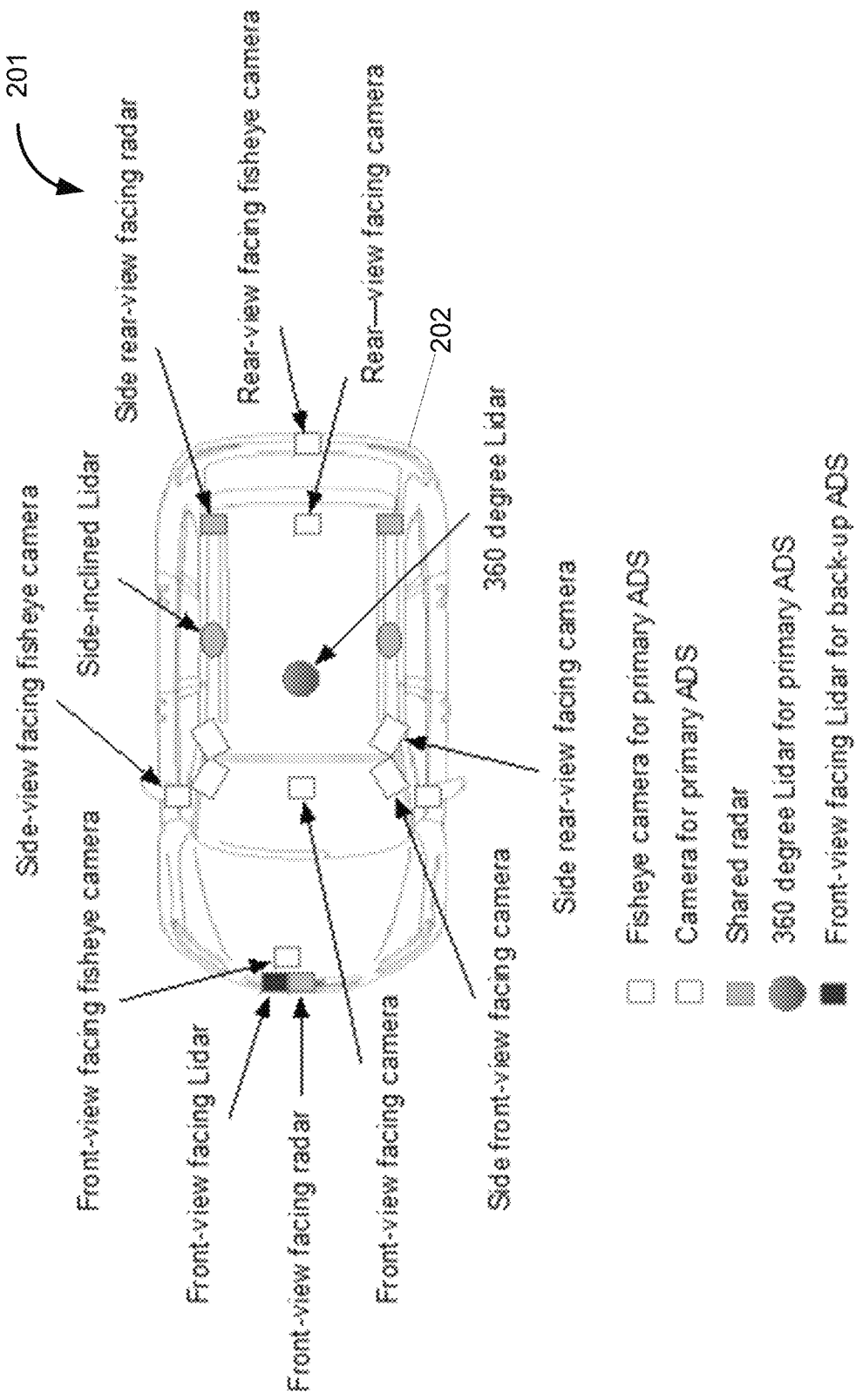
FIG. 2 is a schematic illustrating an example of a sensor layout of an autonomous driving vehicle according to one embodiment.

FIG. 2 is a schematic illustrating an example of a sensor layout of an autonomous driving vehicle according to one embodiment. FIG. 2 shows an example of a sensor layout for the purpose of demonstrating how the system's nominal capability boundary and associated risk can be initially determined. From the sensor system specification and the sensor layout in the ADV, the nominal sensor coverage with redundancy and diversification can be determined for a safety redundancy autonomous driving system. Furthermore, the associated risk within sensor coverage can be estimated from statistical data including a Mean Time Between Failure (MTBF) for each sensor and a corresponding position in the sensor layout. In one embodiment, the MTBF represents how often each sensor indicates a false positive or a false negative occurrence.

In one embodiment, the sensors include a set of primary sensors providing sensor data to a primary ADS, a set of redundant sensors providing sensor data to a back-up ADS, and a set of shared sensors shared by the primary ADS and the back-up ADS. In one embodiment, the sensors include one or more of a camera, a LIDAR device, or a radar device. In this example as shown in FIG. 2, a primary set of sensors includes front-view facing cameras, side-view facing cameras, a rear-view facing fisheye camera, and a 360-degree LIDAR. A secondary sensor includes a front-view facing LIDAR. A set of shared sensors includes side-inclined LIDARs, side rear-view facing radars, rear-view facing camera, and a front-view facing radar. Note that the types of the sensors may impact the overall failure risk of the corresponding zone or the entire vehicle.

Figure 3:
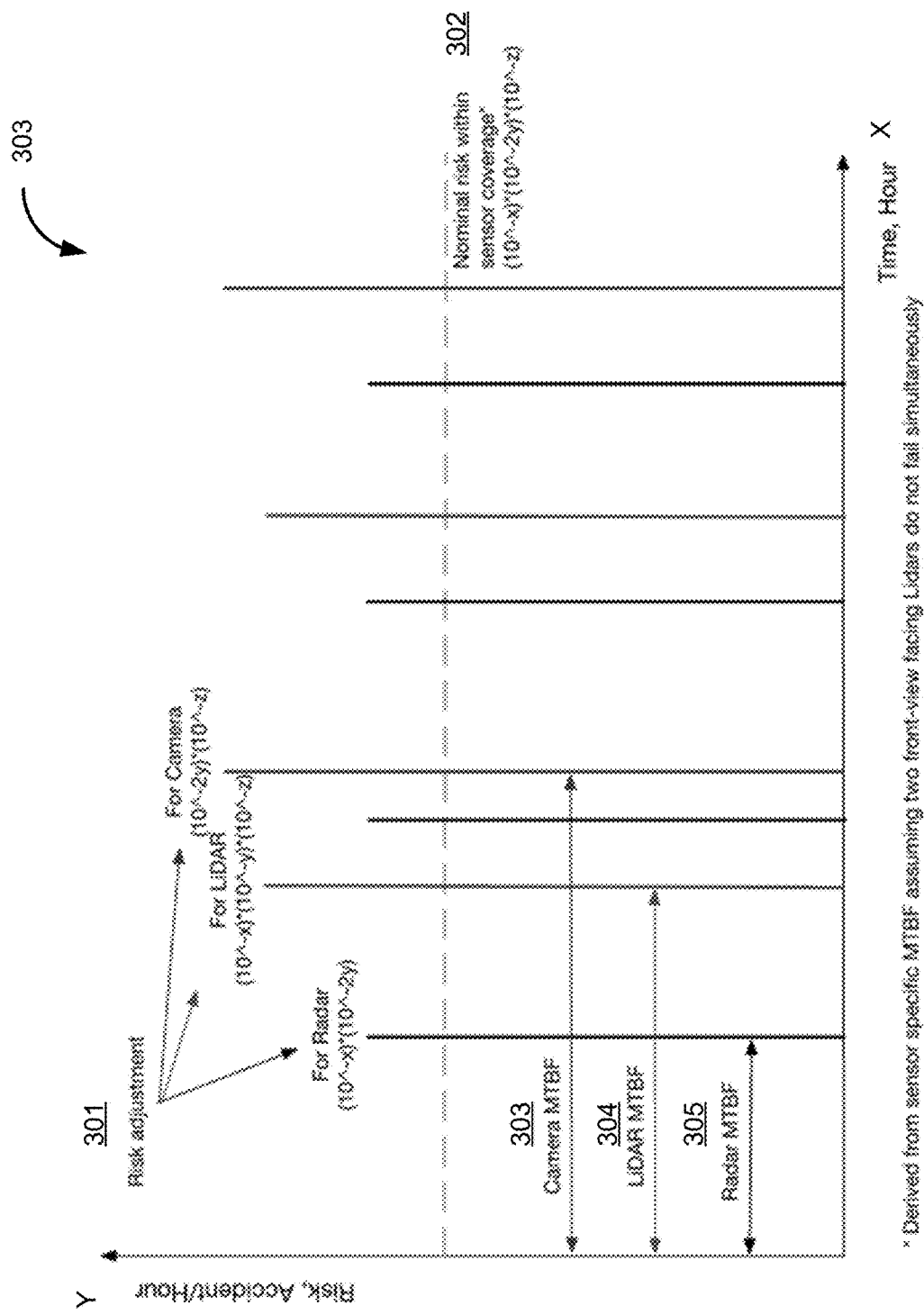
FIG. 3 is a plot of safety redundancy autonomous driving system front-end nominal risk, dynamic risk adjustment vs operating time according to one embodiment of the invention.

FIG. 3 is a diagram of a safety redundancy autonomous driving system front-end nominal risk, dynamic risk adjustment versus operating time according to one embodiment of the invention. Referring to FIG. 3, the Y axis represents risk (accident/hour) and the X axis represents time scale of the autonomous driving vehicle (ADV) operation.

In one embodiment, the plot 303 shows camera MTBF 303, LIDAR MTBF 304, and radar MTBF 305 on the X axis. Here, MTBF is used to represents how often (in hour) the corresponding sensor including the algorithm interpreting sensor data experiences either false positive or false negative which may put the ADV at risk. Risk on the Y axis represents how often the ADV may get into an accident due to sensor system failure. In this example, nominal risk within sensor coverage is derived from a specific sensory lay out such as in FIG. 2 and assuming two front-view facing LIDARs do not normally fail simultaneously.

In one embodiment, the risk Y (accident/hour) associated with sensor performance limitation may be determined based on the following formula:

$$Y = \frac{1}{X}$$

where X is sensor's MTBF.

FIG. 3 shows how dynamic risk adjustment due to individual sensor's performance limitation affects nominal risk at a front-end of a safety redundancy autonomous driving system. In one embodiment, even though nominal risk 302 from sensor system performance can be fairly low, the additional risk due to any of the sensors 303-305 undergoing performance limitation shall not be overlooked. Two methods may be used to reduce this risk such as (i) adjusting each sensor's MTBF in real-time with ground-truth from sensor diagnostic; and (ii) taking additional precaution safety measures when approaching each sensor's MTBF in the course of operation.

In one embodiment, for example, an overall failure risk of the sensors is determined based on the zone failure risks of the predetermined zones based on relative locations of the sensors across the predetermined zones. In one embodiment, the overall failure risk associated with the front end sensor can be represented by $N=(10^{-x})*(10^{-2y})*(10^{-z})$. Variables x, y, and z represent the MTBF for a camera, a LIDAR, and a radar, respectively.

For each sensor, a dynamic risk adjustment 301 is determined based on the overall failure risk of the sensors. For example associated with the sensor layout in FIG. 2, according to one embodiment, the dynamic risk adjustment for the front end radar can be represented by $R_{Radar}=(10^{-x})*(10^{-2y})$. The dynamic risk adjustment for the front end LIDAR can be represented by $R_{LIDAR}=(10^{-x})*(10^{-y})*(10^{-z})$. The dynamic risk adjustment for the front end camera can be represented by $R_{Camem}=(10^{-2y})*(10^{-z})$. Note that in the example as shown in FIG. 2, there are two front-view facing LIDAR devices and it is assumed both LIDAR devices would not fail simultaneously.

Referring back to FIG. 2, a sensor layout 201 associated with the ADV 202 representing a system having sensors mounted on various locations of the ADV 202 is obtained. The sensors in the sensor layout covers predetermined zones surrounding the ADV, including front, side, and rear zones or views. A side zone/view may further include a side front view, a side inclined view, and/or a side rear view. In one embodiment, the predetermined zones include a front zone, a side zone, and a rear zone of the ADV. For each of the predetermined zones, a zone failure risk of one or more sensors within the predetermined zones is estimated based on statistical operational data of the one or more sensors.

As shown in FIG. 3, an overall failure risk 302 of the sensors is determined based on the zone failure risks of the predetermined zones based on relative locations of the sensors across the predetermined zones. A dynamic risk adjustment 301 is determined based on the overall failure risk of the sensors, the dynamic risk adjustment representing a reliability of a sensor system associated with the ADV for estimating a safety of autonomous driving of the ADV. In one embodiment, the dynamic risk adjustment is used to determine a risk associated with the sensor system if one of the sensors fails.

FIG. 4A shows a safety redundancy autonomous driving system table according to one embodiment. Table in FIG. 4A lists the risk associated with the safety redundancy configuration in FIG. 1C and the sensor layout in FIG. 2. FIG. 4A provides estimated total MTBF for the safety redundancy autonomous driving system for the primary ADS and the back-up ADS.

In one embodiment, $10^x$, $10^y$ and $10^z$ are MTBFs for a camera, a LIDAR, and a radar, respectively and they are statistical values for the respective sensor/algorithm performance. MTBF may be determined by vehicle simulation having a specific sensor layout such as testing how often a sensor reports a false positive or false negative of object detection. In one embodiment, the sensors include primary sensors, shared sensors, and redundant sensors. As MTBF increases, the risk associated with the sensor system decreases.

In one embodiment, x, y, and z is the exponential factor of 10 for each sensor's MTBF. Referring to FIG. 4A, x is for a camera, y is for a LIDAR, and z is for a radar. In one embodiment, the MTBF for each sensor is adjusted based on a driving environment or a driving area.

For example, the total MTBF associated with the front-end sensor for the primary ADS system and the back-up ADS system is $10^{x+2y+z}$. A shared sensor is not counted twice but a redundant sensor is added in the total MTBF calculation. In other words, shared sensors are counted only once in the total MTBF calculation to avoid common cause failure or limitation. The MTBF for the front end camera for the primary ADS system is $10^x$, LIDAR is $10^y$, and radar is $10^z$. The table 401 can be used to determine a dynamic risk adjustment associated with sensor coverage, i.e. effective sensor coverage as well as sensor undergoing performance limitation.

FIG. 4B shows a safety redundancy autonomous driving system (primary ADS system only) table according to one embodiment. Table in FIG. 4B lists the risk associated with the safety redundancy module in FIG. 1C and the sensor layout in FIG. 2. FIG. 4B provides estimated total MTBF for the safety redundancy autonomous driving system (primary ADS only). For example, the total MTBF associated with the front-end sensor for the primary ADS system is $10^{x+y+z}$.

FIG. 4C shows a safety redundancy autonomous driving system (back-up ADS system only) table according to one embodiment. Table in FIG. 4C lists the risk associated with the safety redundancy module in FIG. 1C and the sensor layout in FIG. 2. FIG. 4C provides estimated total MTBF for the safety redundancy autonomous driving system (back-up or secondary ADS only). For example, the total MTBF associated with the front-end sensor for the back-up ADS system is $NY'$. By calculating the risk of the overall ADS redundancy system, primary system only, or secondary system only, one can easily estimate the risk associated with each of the systems above during real-time operation and take necessary measures to ensure the safety of the ADV.

Figure 5:
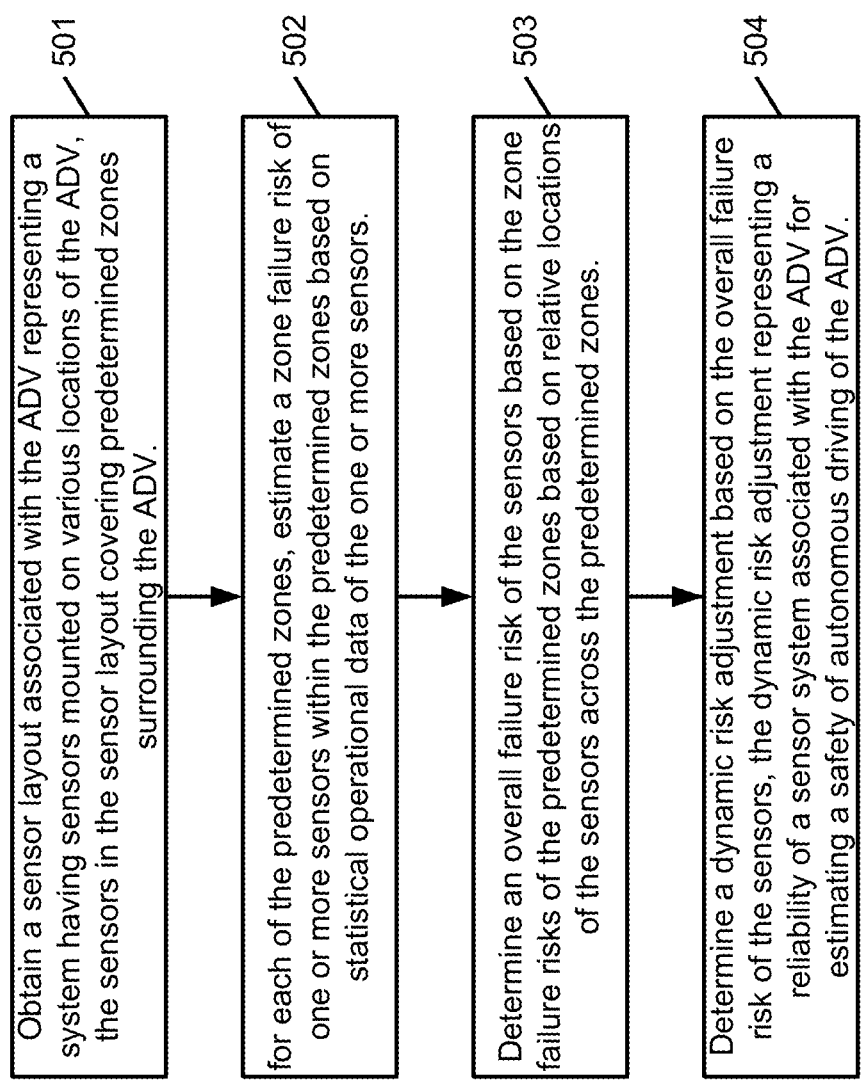
FIG. 5 is a flow diagram illustrating a process of operating an autonomous driving vehicle according to one embodiment of the invention.

FIG. 5 is a flow diagram illustrating a process of operating an autonomous driving vehicle according to one embodiment of the invention. Process 500 may be performed by processing logic which may include software, hardware, or a combination thereof. For example, process 500 may be performed by a server such as server 602 of FIG. 6 to estimate the over risks of the sensors of a particular type of ADVs. Referring to FIG. 5, in operation 501, processing logic obtains a sensor layout associated with the ADV representing a system having sensors mounted on various locations of the ADV. The sensors in the sensor layout covers predetermined zones surrounding the ADV. In operation 502, processing logic estimates a zone failure risk of one or more sensors within the predetermined zones based on statistical operational data of the one or more sensors for each of the predetermined zones. In operation 503, the processing logic determines an overall failure risk of the sensors based on the zone failure risks of the predetermined zones based on relative locations of the sensors across the predetermined zones. In operation 504, the processing logic determines a dynamic risk adjustment based on the overall failure risk of the sensors, the dynamic risk adjustment representing a reliability of a sensor system associated with the ADV for estimating a safety of autonomous driving of the ADV.

In one embodiment, the dynamic risk adjustment is determined based on identifying which sensor is currently undergoing performance limitation and excluding the identified sensor from the risk estimation.

Figure 6:
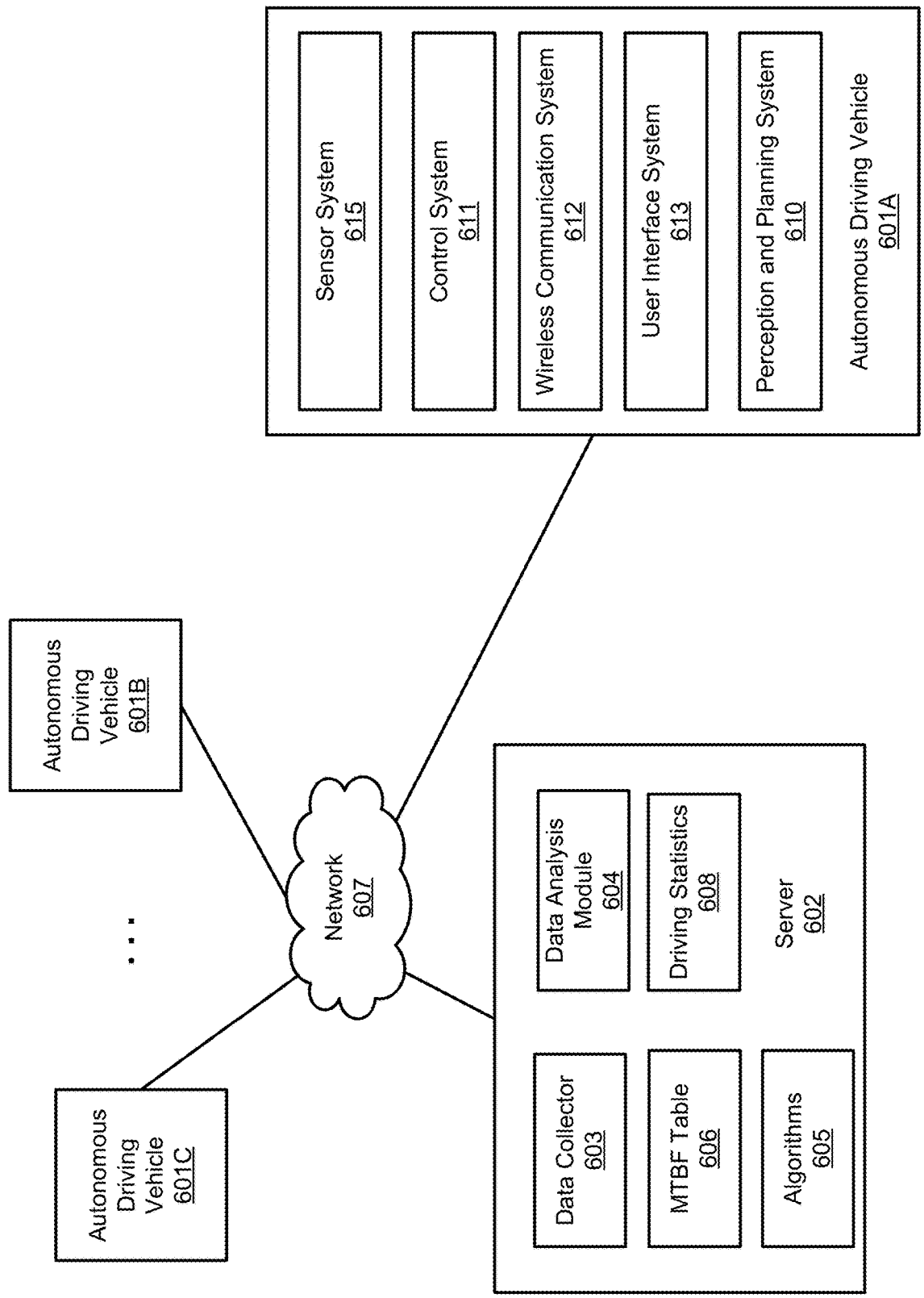
FIG. 6 is a block diagram illustrating an autonomous driving vehicle according to one embodiment.

FIG. 6 is a block diagram illustrating an autonomous driving vehicle according to one embodiment of the disclosure. Referring to FIG. 6, one or more ADVs 601A-601C (collectively referred to as ADVs 601) may be communicatively coupled to one or more servers 602 over a network 607, which may be any type of networks such as a local area network (LAN), a wide area network (WAN) such as the Internet, a cellular network, a satellite network, or a combination thereof, wired or wireless. The server(s) may be any kind of servers or a cluster of servers, such as Web or cloud servers, application servers, backend servers, or a combination thereof. A server may be a data analytics server.

Server 602 may be a data analytics system to perform data analytics services for a variety of clients. In one embodiment, data analytics system 602 includes data collector 603 and data analysis module 604. Data collector 603 collects driving statistics 608 from a variety of vehicles, either autonomous vehicles or regular vehicles driven by human drivers. Driving statistics 608 include information indicating the driving commands (e.g., throttle, brake, steering commands) issued and responses of the vehicles (e.g., speeds, accelerations, decelerations, directions) captured by sensors of the vehicles at different points in time. Driving statistics 608 may further include information describing the driving environments at different points in time, such as, for example, routes (including starting and destination locations), MPOIs, road conditions, weather conditions, etc. Driving statistics 608 may include the operational statistics of sensors such as MTBF of the sensors.

In one embodiment, data collector 603 obtains a sensor layout associated with the ADV representing a system having sensors mounted on various locations of the ADV. The sensors in the sensor layout cover predetermined zones surrounding the ADV. Data analysis module 604 performs an analysis or simulation to generate MTBF table 606 representing statistical values of MTBF for the respective sensor/algorithm performance. MTBF is determined by vehicle simulation having a specific sensor layout such as testing how often a sensor reports a false positive or false negative of object detection.

In one embodiment, algorithms 605 may include an algorithm to estimate a zone failure risk of one or more sensors within the predetermined zones based on statistical operational data of the one or more sensors for each of the predetermined zones. Algorithms 605 may also include an algorithm to determine an overall failure risk of the sensors based on the zone failure risks of the predetermined zones based on relative locations of the sensors across the predetermined zones. Further, algorithms 605 may include an algorithm to determine a dynamic risk adjustment based on the overall failure risk of the sensors. In one embodiment, the overall failure risk of the sensors and the dynamic risk adjustment are determined based on the MTBF table 606 associated with the ADV sensor layout. The determined dynamic risk adjustment represents a reliability of a sensor system associated with the ADV for estimating a safety of autonomous driving of the ADV. Algorithms 605 can then be uploaded on ADVs to be utilized during autonomous driving in real-time.

An autonomous driving vehicle refers to a vehicle that can be configured to in an autonomous mode in which the vehicle navigates through an environment with little or no input from a driver. Such an autonomous driving vehicle can include a sensor system having one or more sensors that are configured to detect information about the environment in which the vehicle operates. The vehicle and its associated controller(s) use the detected information to navigate through the environment. Autonomous driving vehicle 601A can operate in a manual mode, a full autonomous mode, or a partial autonomous mode. Note that the description of ADV 601 can also be applicable to other ADVs 601B-601C.

In one embodiment, autonomous driving vehicle 601A includes, but is not limited to, perception and planning system 610, vehicle control system 611, wireless communication system 612, user interface system 613, and sensor system 615. Autonomous driving vehicle 601A may further include certain common components included in ordinary vehicles, such as, an engine, wheels, steering wheel, transmission, etc., which may be controlled by vehicle control system 611 and/or perception and planning system 610 using a variety of communication signals and/or commands, such as, for example, acceleration signals or commands, deceleration signals or commands, steering signals or commands, braking signals or commands, etc.

Components 610-615 may be communicatively coupled to each other via an interconnect, a bus, a network, or a combination thereof. For example, components 610-615 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 7:
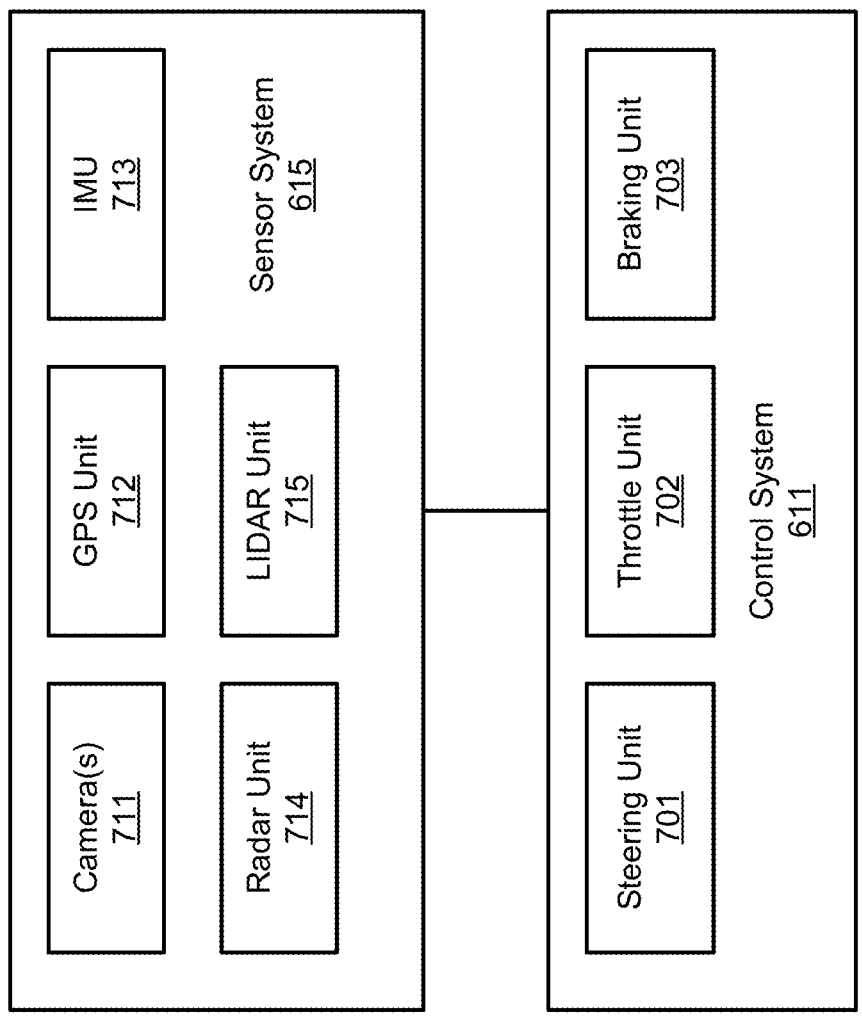
FIG. 7 is a block diagram illustrating an example of an autonomous driving vehicle according to one embodiment.

Referring now to FIG. 7, in one embodiment, sensor system 615 includes, but it is not limited to, one or more cameras 711, global positioning system (GPS) unit 712, inertial measurement unit (IMU) 713, radar unit 714, and a light detection and range (LIDAR) unit 715. GPS system 712 may include a transceiver operable to provide information regarding the position of the autonomous driving vehicle. IMU unit 713 may sense position and orientation changes of the autonomous driving vehicle based on inertial acceleration. Radar unit 714 may represent a system that utilizes radio signals to sense objects within the local environment of the autonomous driving vehicle. In some embodiments, in addition to sensing objects, radar unit 714 may additionally sense the speed and/or heading of the objects. LIDAR unit 715 may sense objects in the environment in which the autonomous driving vehicle is located using lasers. LIDAR unit 715 could include one or more laser sources, a laser scanner, and one or more detectors, among other system components. Cameras 711 may include one or more devices to capture images of the environment surrounding the autonomous driving vehicle. Cameras 711 may be still cameras and/or video cameras. A camera may be mechanically movable, for example, by mounting the camera on a rotating and/or tilting a platform.

Sensor system 615 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous driving vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 611 includes, but is not limited to, steering unit 701, throttle unit 702 (also referred to as an acceleration unit), and braking unit 703. Steering unit 701 is to adjust the direction or heading of the vehicle. Throttle unit 702 is to control the speed of the motor or engine that in turn controls the speed and acceleration of the vehicle. Braking unit 703 is to decelerate the vehicle by providing friction to slow the wheels or tires of the vehicle. Note that the components as shown in FIG. 7 may be implemented in hardware, software, or a combination thereof.

Referring back to FIG. 6, wireless communication system 612 is to allow communication between autonomous driving vehicle 601A and external systems, such as devices, sensors, other vehicles, etc. For example, wireless communication system 612 can wirelessly communicate with one or more devices directly or via a communication network. Wireless communication system 612 can use any cellular communication network or a wireless local area network (WLAN), e.g., using WiFi to communicate with another component or system. Wireless communication system 612 could communicate directly with a device (e.g., a mobile device of a passenger, a display device, a speaker within vehicle 601A), for example, using an infrared link, Bluetooth, etc. User interface system 613 may be part of peripheral devices implemented within vehicle 601A including, for example, a keyboard, a touch screen display device, a microphone, and a speaker, etc.

Some or all of the functions of autonomous driving vehicle 601A may be controlled or managed by perception and planning system 610, especially when operating in an autonomous driving mode. Perception and planning system 610 includes the necessary hardware (e.g., processor(s), memory, storage) and software (e.g., operating system, planning and routing programs) to receive information from sensor system 615, control system 611, wireless communication system 612, and/or user interface system 613, process the received information, plan a route or path from a starting point to a destination point, and then drive vehicle 601A based on the planning and control information. Alternatively, perception and planning system 610 may be integrated with vehicle control system 611.

For example, a user as a passenger may specify a starting location and a destination of a trip, for example, via a user interface. Perception and planning system 610 obtains the trip related data. For example, perception and planning system 610 may obtain location and route information from an MPOI server. The location server provides location services and the MPOI server provides map services and the POIs of certain locations. Alternatively, such location and MPOI information may be cached locally in a persistent storage device of perception and planning system 610.

While autonomous driving vehicle 601A is moving along the route, perception and planning system 610 may also obtain real-time traffic information from a traffic information system or server (TIS). Note that the servers may be operated by a third party entity. Alternatively, the functionalities of the servers may be integrated with perception and planning system 610. Based on the real-time traffic information, MPOI information, and location information, as well as real-time local environment data detected or sensed by sensor system 615 (e.g., obstacles, objects, nearby vehicles), perception and planning system 610 can plan an optimal route and drive vehicle 601A, for example, via control system 611, according to the planned route to reach the specified destination safely and efficiently.

Figure 8:
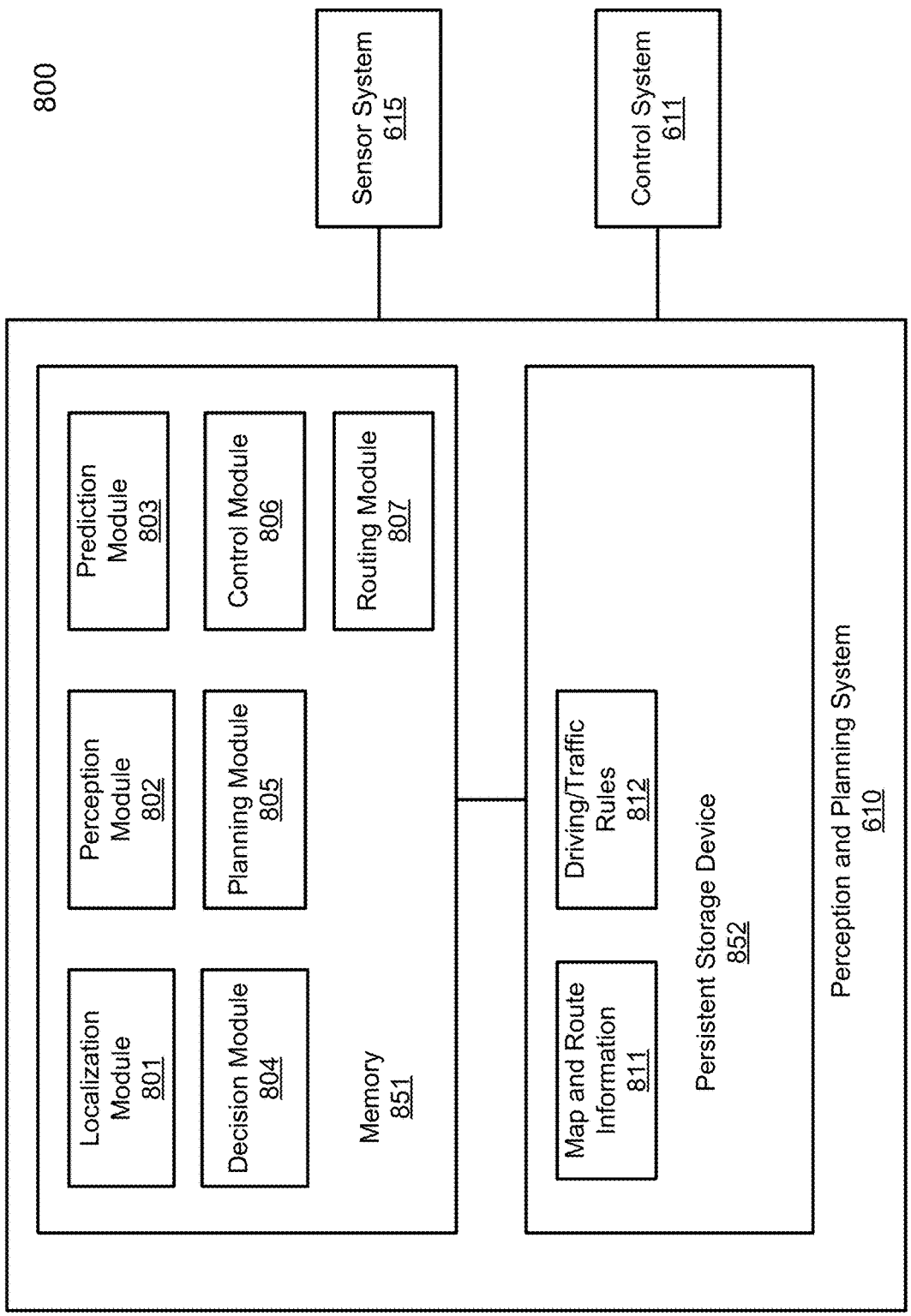
FIG. 8 is a block diagram illustrating an example of a perception and planning system used with an autonomous driving vehicle according to one embodiment.

FIG. 8 is a block diagram illustrating an example of a perception and planning system used with an autonomous driving vehicle according to one embodiment. System 800 may be implemented as a part of autonomous driving vehicle 601A of FIG. 6 including, but is not limited to, perception and planning system 610, control system 611, and sensor system 615. Referring to FIG. 8, perception and planning system 610 includes, but is not limited to, localization module 801, perception module 802, prediction module 803, decision module 804, planning module 805, control module 806, routing module 807.

Some or all of modules 801-807 may be implemented in software, hardware, or a combination thereof. For example, these modules may be installed in persistent storage device 852, loaded into memory 851, and executed by one or more processors (not shown). Note that some or all of these modules may be communicatively coupled to or integrated with some or all modules of vehicle control system 611 of FIG. 7. Some of modules 801-807 may be integrated together as an integrated module.

Localization module 801 determines a current location of autonomous driving vehicle 300 (e.g., leveraging GPS unit 712) and manages any data related to a trip or route of a user. Localization module 801 (also referred to as a map and route module) manages any data related to a trip or route of a user. A user may log in and specify a starting location and a destination of a trip, for example, via a user interface. Localization module 801 communicates with other components of autonomous driving vehicle 300, such as map and route information 811, to obtain the trip related data. For example, localization module 801 may obtain location and route information from a location server and a map and POI (MPOI) server. A location server provides location services and an MPOI server provides map services and the POIs of certain locations, which may be cached as part of map and route information 811. While autonomous driving vehicle 300 is moving along the route, localization module 801 may also obtain real-time traffic information from a traffic information system or server.

Based on the sensor data provided by sensor system 615 and localization information obtained by localization module 801, a perception of the surrounding environment is determined by perception module 802. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 802 may include a computer vision system or functionalities of a computer vision system to process and analyze images captured by one or more cameras in order to identify objects and/or features in the environment of autonomous driving vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 802 can also detect objects based on other sensors data provided by other sensors such as a radar and/or LIDAR.

For each of the objects, prediction module 803 predicts what the object will behave under the circumstances. The prediction is performed based on the perception data perceiving the driving environment at the point in time in view of a set of map/rout information 811 and traffic rules 812. For example, if the object is a vehicle at an opposing direction and the current driving environment includes an intersection, prediction module 803 will predict whether the vehicle will likely move straight forward or make a turn. If the perception data indicates that the intersection has no traffic light, prediction module 803 may predict that the vehicle may have to fully stop prior to enter the intersection. If the perception data indicates that the vehicle is currently at a left-turn only lane or a right-turn only lane, prediction module 803 may predict that the vehicle will more likely make a left turn or right turn respectively.

For each of the objects, decision module 804 makes a decision regarding how to handle the object. For example, for a particular object (e.g., another vehicle in a crossing route) as well as its metadata describing the object (e.g., a speed, direction, turning angle), decision module 804 decides how to encounter the object (e.g., overtake, yield, stop, pass). Decision module 804 may make such decisions according to a set of rules such as traffic rules or driving rules 812, which may be stored in persistent storage device 852.

Routing module 807 is configured to provide one or more routes or paths from a starting point to a destination point. For a given trip from a start location to a destination location, for example, received from a user, routing module 807 obtains route and map information 811 and determines all possible routes or paths from the starting location to reach the destination location. Routing module 807 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 804 and/or planning module 805. Decision module 804 and/or planning module 805 examine all of the possible routes to select and modify one of the most optimal routes in view of other data provided by other modules such as traffic conditions from localization module 801, driving environment perceived by perception module 802, and traffic condition predicted by prediction module 803. The actual path or route for controlling the ADV may be close to or different from the reference line provided by routing module 807 dependent upon the specific driving environment at the point in time.

Based on a decision for each of the objects perceived, planning module 805 plans a path or route for the autonomous driving vehicle, as well as driving parameters (e.g., distance, speed, and/or turning angle), using a reference line provided by routing module 807 as a basis. That is, for a given object, decision module 804 decides what to do with the object, while planning module 805 determines how to do it. For example, for a given object, decision module 804 may decide to pass the object, while planning module 805 may determine whether to pass on the left side or right side of the object. Planning and control data is generated by planning module 805 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 806 controls and drives the autonomous driving vehicle, by sending proper commands or signals to vehicle control system 611, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 805 plans a next route segment or path segment, for example, including a target position and the time required for the ADV to reach the target position.

Alternatively, planning module 805 may further specify the specific speed, direction, and/or steering angle, etc. In one embodiment, planning module 805 plans a route segment or path segment for the next predetermined period of time such as 5 seconds. For each planning cycle, planning module 805 plans a target position for the current cycle (e.g., next 5 seconds) based on a target position planned in a previous cycle. Control module 806 then generates one or more control commands (e.g., throttle, brake, steering control commands) based on the planning and control data of the current cycle.

Note that decision module 804 and planning module 805 may be integrated as an integrated module. Decision module 804/planning module 805 may include a navigation system or functionalities of a navigation system to determine a driving path for the autonomous driving vehicle. For example, the navigation system may determine a series of speeds and directional headings to affect movement of the autonomous driving vehicle along a path that substantially avoids perceived obstacles while generally advancing the autonomous driving vehicle along a roadway-based path leading to an ultimate destination. The destination may be set according to user inputs via user interface system 613. The navigation system may update the driving path dynamically while the autonomous driving vehicle is in operation. The navigation system can incorporate data from a GPS system and one or more maps so as to determine the driving path for the autonomous driving vehicle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
   obtaining a sensor layout associated with the ADV representing a sensor system having a plurality of sensors mounted on a plurality of locations of the ADV, the plurality of sensors in the sensor layout covering a plurality of predetermined zones surrounding the ADV;
   for each of the plurality of predetermined zones, estimating a zone failure risk of one or more sensors of the plurality of sensors within the predetermined zones based on statistical operational data of the one or more sensors;
   determining an overall failure risk of the plurality of sensors based on the zone failure risks of the predetermined zones based on relative locations of the plurality of sensors across the predetermined zones;
   determining a plurality of dynamic risk adjustments corresponding to the plurality of sensors, the plurality of dynamic risk adjustments representing a reliability of the sensor system associated with the ADV, wherein the determining the plurality of dynamic risk adjustments comprises:
      for each sensor of the plurality of sensors, determining a dynamic risk adjustment of the plurality of dynamic risk adjustments based on the overall failure risk of the plurality of sensors;
      and
   controlling the ADV to drive autonomously based on the plurality of dynamic risk adjustments to ensure a safety of the autonomous driving of the ADV.

2. The method of claim 1, wherein the statistical operational data includes a mean time between failure (MTBF) for each sensor and a corresponding position in the sensor layout, the MTBF representing how often each sensor experiences a false positive or a false negative occurrence.

3. The method of claim 2, wherein the MTBF for each sensor is adjusted based on a driving environment or a driving area.

4. The method of claim 1, wherein the plurality of sensors includes a set of primary sensors providing sensor data to a primary autonomous driving system (ADS), a set of redundant sensors providing sensor data to a back-up ADS, and a set of shared sensors shared by the primary ADS and the back-up ADS.

5. The method of claim 1, wherein the plurality of sensors comprising one or more of a camera, a LIDAR, or a radar.

6. The method of claim 1, wherein the plurality of zones comprises a front zone, a side zone, and a rear zone of the ADV.

7. The method of claim 1, wherein the plurality of dynamic risk adjustments are used to determine a risk associated with the sensor system if one of the plurality of the sensors fails.

8. A non-transitory machine-readable medium having instructions stored therein, which when executed by a processor, cause the processor to perform operations of operating an autonomous driving vehicle (ADV), the operations comprising:

obtaining a sensor layout associated with the ADV representing a sensor system having a plurality of sensors mounted on a plurality of locations of the ADV, the plurality of sensors in the sensor layout covering a plurality of predetermined zones surrounding the ADV;

for each of the plurality of predetermined zones, estimating a zone failure risk of one or more sensors of the plurality of sensors within the predetermined zones based on statistical operational data of the one or more sensors;

determining an overall failure risk of the plurality of sensors based on the zone failure risks of the predetermined zones based on relative locations of the plurality of sensors across the predetermined zones;

determining a plurality of dynamic risk adjustments corresponding to the plurality of sensors, the plurality of dynamic risk adjustments representing a reliability of the sensor system associated with the ADV, wherein the determining the plurality of dynamic risk adjustments comprises:

for each sensor of the plurality of sensors, determining a dynamic risk adjustment of the plurality of dynamic risk adjustments based on the overall failure risk of the plurality of sensors;

and controlling the ADV to drive autonomously based on the plurality of dynamic risk adjustments to ensure a safety of the autonomous driving of the ADV.

9. The machine-readable medium of claim 8, wherein the statistical operational data includes a mean time between failure (MTBF) for each sensor and a corresponding position in the sensor layout, the MTBF representing how often each sensor experiences a false positive or a false negative occurrence.

10. The machine-readable medium of claim 9, wherein the MTBF for each sensor is adjusted based on a driving environment or a driving area.

11. The machine-readable medium of claim 8, wherein the plurality of sensors includes a set of primary sensors providing sensor data to a primary autonomous driving system (ADS), a set of redundant sensors providing sensor data to a back-up ADS, and a set of shared sensors shared by the primary ADS and the back-up ADS.

12. The machine-readable medium of claim 8, wherein the plurality of sensors comprising one or more of a camera, a LIDAR, or a radar.

13. The machine-readable medium of claim 8, wherein the plurality of zones comprises a front zone, a side zone, and a rear zone of the ADV.

14. The machine-readable medium of claim 8, wherein the plurality of dynamic risk adjustments are used to determine a risk associated with the sensor system if one of the plurality of the sensors fails.

15. A data processing system, comprising:

a processor; and a memory coupled to the processor to store instructions, which when executed by the processor, cause the processor to perform operations of operating an autonomous driving vehicle (ADV), the operations including:

obtaining a sensor layout associated with the ADV representing a sensor system having a plurality of sensors mounted on a plurality of locations of the ADV, the plurality of sensors in the sensor layout covering a plurality of predetermined zones surrounding the ADV;

for each of the plurality of predetermined zones, estimating a zone failure risk of one or more sensors of the plurality of sensors within the predetermined zones based on statistical operational data of the one or more sensors;

determining an overall failure risk of the plurality of sensors based on the zone failure risks of the predetermined zones based on relative locations of the plurality of sensors across the predetermined zones;

determining a plurality of dynamic risk adjustments corresponding to the plurality of sensors, the plurality of dynamic risk adjustments representing a reliability of the sensor system associated with the ADV, wherein the determining the plurality of dynamic risk adjustments comprises:

for each sensor of the plurality of sensors, determining a dynamic risk adjustment of the plurality of dynamic risk adjustments based on the overall failure risk of the plurality of sensors; and controlling the ADV to drive autonomously based on the plurality of dynamic risk adjustments to ensure a safety of the autonomous driving of the ADV.

16. The system of claim 15, wherein the statistical operational data includes a mean time between failure (MTBF) for each sensor and a corresponding position in the sensor layout, the MTBF representing how often each sensor experiences a false positive or a false negative occurrence.

17. The system of claim 16, wherein the MTBF for each sensor is adjusted based on a driving environment or a driving area.

18. The system of claim 15, wherein the plurality of sensors includes a set of primary sensors providing sensor data to a primary autonomous driving system (ADS), a set of redundant sensors providing sensor data to a back-up ADS, and a set of shared sensors shared by the primary ADS and the back-up ADS.

19. The system of claim 15, wherein the plurality of sensors comprising one or more of a camera, a LIDAR, or a radar.

20. The system of claim 15, wherein the plurality of zones comprises a front zone, a side zone, and a rear zone of the ADV.

21. The system of claim 15, wherein the plurality of dynamic risk adjustments are used to determine a risk associated with the sensor system if one of the plurality of the sensors fails.

\* \* \* \* \*